(No Model.)

A. M. WHITE.
VELOCIPEDE WHEEL.

No. 310,857. Patented Jan. 13, 1885.

WITNESSES.
Homer H. Fiske
Henry A. Lienhard

INVENTOR.
Albert M. White
By Charles E. Pratt
Atty

UNITED STATES PATENT OFFICE.

ALBERT M. WHITE, OF WATERBURY, ASSIGNOR TO THE POPE MANUFACTURING COMPANY, HARTFORD, CONNECTICUT.

VELOCIPEDE-WHEEL.

SPECIFICATION forming part of Letters Patent No. 310,857, dated January 13, 1885.

Application filed November 7, 1884. (No model.)

*To all whom it may concern:*

Be it known that I, ALBERT M. WHITE, of Waterbury, Connecticut, have invented certain new and useful Improvements in Wheels for Velocipedes and other Vehicles, of which the following is a specification.

My improvements relate to that part of the wheel called the "rim" or "felly," and more particularly to that class of wheels known as "suspension" wheels and to that class of fellies known as "tubular" or "hollow" fellies.

Heretofore hollow rims have been made sometimes of tubing rolled or otherwise wrought into the desired form and prepared for the reception of the tire and for connection with the spokes, and sometimes they have been made of sheet metal treated in a similar manner, the sheet metal either being worked in the form of a tube or being bent into the form of a rim, or vice versa, and sometimes being of one strip of metal with edges lapped on the outer or concave side, or else on the inner or convex side, and sometimes made of a strip of metal lapped both on the outer or concave side and on the inner or convex side, or else with both seams on the outer side near the periphery of the rim. With either of these forms of construction there are some disadvantages more or less serious, arising from expensiveness of production, or difficulty of construction, or the presence of seams on the outer surfaces of the rim, or from weakness of structure, or from the difficulty of making a good finish, or from incorrect distribution of the metal, or from impairment of the metal by brazing, or from fastening of the seams, or from several of these difficulties.

The object of my improvements is to produce a rim which shall avoid all these difficulties, and at the same time have the greatest possible lightness and be capable of production for either heavy service or light service, of taking a smooth seamless finish on its exterior surfaces, having great strength of section, and yet no waste of metal, and at the same time be of economical production.

Figure 1:
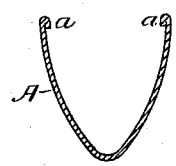
Figure 2:
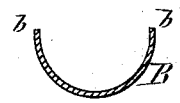
Figure 3:
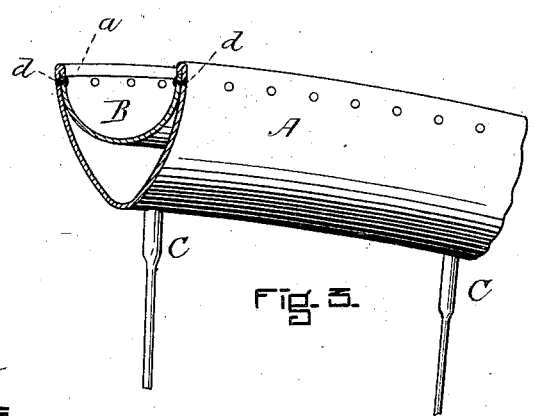

In the drawings, Figure 1 shows the inner convex part, and Fig. 2 shows the outer concave part, of a rim embodying my improvements in one form, and Fig. 3 shows in elevation a section of the same two parts in a finished rim with parts of the spokes.

A is a portion of the metallic felly, consisting of the inner convex portion which lies toward the hub of the wheel, and the two sides or lateral portions adjacent to the tire-surface. B is a portion complementary to the part A of a metallic felly, constituting, when in place, the outer concave side or tire side of the hollow rim. C C are the spokes of the wheel. The part A may be rolled up from sheet metal, with the edges lapped over, as at *a a*, and the two ends brought together and brazed or otherwise fastened into the form of a ring, and the part B may be rolled up from sheet metal, either in a strip or a ring in which the two ends are not fastened together, and may be sprung into place in the part A, with the edges *b b* meeting the edges *a a*, and for small wheels or wheels for light purposes the two parts will then stay in position without further fastening of the edges. Where, however, considerable strain is to be borne by the rim and it is desirable to fasten the edges *a b* at the seam, this may be done by brazing, as heretofore, as seams at other parts of the rim have been fastened, or by soldering, or as I construct them and prefer to do it, by inserting a series of small rivets, *d d*, on either side, by which the two parts of the rim are securely fastened, and which may be smoothed down on the lateral surfaces of the rim, so as to form no projection.

The two parts of the rim may be put together while both are in a straight strip, curved only to their lateral or sectional form, or after both have been curved or drawn into an annular form. The portion A of the rim may be made of thicker material than B. The edges *a b* of the two parts may be brought together nearer to or farther from the outermost line of part A. The rivets may be used alone or in connection with solder, or the rim may be made serviceable enough for certain purposes without the use of rivets. The spokes may be joined to the rim in any approved method. The tire may be of any form and attached in any mode, and may be of rubber or of other material. The curves of the parts A and B may be modified, and the manner of working the material and constructing the rim may be of any approved method heretofore known without departing from the substance of my invention.

I claim as new and of my invention—

1. A hollow metallic rim consisting of two parts, one part forming the spoke side of the rim and having inwardly-projecting lips $a\ a$, and the other part forming the tire side of the rim and meeting the former on its inside at the lips, essentially as set forth.

2. A metallic felly consisting of two pieces of wrought metal, one piece forming the interior convex spoke-receiving portion, and the other part forming the exterior concave tire-receiving portion, of the rim, placed together with their edges meeting and fastened at the tire side, essentially as set forth.

3. A metallic wheel-rim consisting of the parts A and B, placed together, and fastened at or near their edges by rivets $d\ d$, essentially as set forth.

ALBERT M. WHITE.

Witnesses:
NELSON KING,
HARRY B. LESTER.